United States Patent
Banatao et al.

(10) Patent No.: US 12,499,419 B2
(45) Date of Patent: Dec. 16, 2025

(54) TECHNIQUES FOR PREDICTING THE SPECTRA OF MATERIALS USING MOLECULAR METADATA

(71) Applicant: X Development LLC, Mountain View, CA (US)

(72) Inventors: Diosdado Rey Banatao, Los Altos Hills, CA (US); Gearoid Murphy, Mountain View, CA (US); Anarbek Iskaliyev, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 1451 days.

(21) Appl. No.: 16/948,767

(22) Filed: Sep. 30, 2020

(65) Prior Publication Data
US 2022/0101276 A1    Mar. 31, 2022

(51) Int. Cl.
  *G06Q 10/30*    (2023.01)
  *G06F 40/42*    (2020.01)
  *G06N 3/049*    (2023.01)
  *G16C 20/30*    (2019.01)
  *G16C 20/70*    (2019.01)

(52) U.S. Cl.
  CPC ............ *G06Q 10/30* (2013.01); *G06F 40/42* (2020.01); *G06N 3/049* (2013.01); *G16C 20/30* (2019.02); *G16C 20/70* (2019.02)

(58) Field of Classification Search
  CPC ........ G06Q 10/30; G16C 20/30; G16C 20/70; G06F 40/42; G06N 3/049
  See application file for complete search history.

(56) References Cited

U.S. PATENT DOCUMENTS

| | | | | |
|---|---|---|---|---|
| 6,654,736 | B1* | 11/2003 | Ellis | G16C 20/90 |
| 7,676,442 | B2* | 3/2010 | Ben-Hur | G06V 10/761 |
| | | | | 706/45 |
| 9,638,683 | B2* | 5/2017 | Danes | G01N 33/442 |

(Continued)

OTHER PUBLICATIONS

Kiyohara S, Miyata T, Tsuda K, Mizoguchi T. Data-driven approach for the prediction and interpretation of core-electron loss spectroscopy. Sci Rep. Sep. 6, 2018;8(1):13548. doi: 10.1038/s41598-018-30994-6. PMID: 30190483; PMCID: PMC6127203. (Year: 2018).*

Hakime Öztürk, Arzucan Özgür, Philippe Schwaller, Teodoro Laino, Elif Ozkirimli. Exploring chemical space using natural language processing methodologies for drug discovery. Drug Discovery Today, vol. 25, Issue 4, 2020, pp. 689-705, ISSN 1359-6446, https://doi.org/10.1016/j.drudis.2020.01.020.. (Year: 2020).*

(Continued)

*Primary Examiner* — Jeremy L Stanley
(74) *Attorney, Agent, or Firm* — Mughal Gaudry & Franklin PC

(57) ABSTRACT

A method for generating spectroscopic data includes inputting, by a computing device, a text string comprising a structural representation of a material to an encoder of a natural language processing (NLP) model implemented with a deep neural network. The method includes generating, using the encoder of the NLP model, an encoded representation of the text string. The text string may include latent chemical bond information of the material. The method includes mapping, by the computing device, the encoded representation including the latent chemical bond information to a spectrum array, the spectrum array including predicted spectroscopic data of the material. The method also includes outputting, by the computing device, the spectrum array.

25 Claims, 6 Drawing Sheets

(56) References Cited

U.S. PATENT DOCUMENTS

| | | | | |
|---|---|---|---|---|
| 2003/0229456 | A1* | 12/2003 | Beger | G16C 20/30 702/27 |
| 2004/0220749 | A1* | 11/2004 | Miller | G01N 21/25 702/19 |
| 2010/0179934 | A1* | 7/2010 | Howley | G06F 18/2411 702/71 |
| 2013/0235255 | A1* | 9/2013 | Westphal | G01N 21/25 348/360 |
| 2016/0110584 | A1* | 4/2016 | Remiszewski | G06V 20/69 382/133 |
| 2017/0092476 | A1* | 3/2017 | Duchoslav | G16C 20/90 |
| 2017/0336264 | A1* | 11/2017 | Chanda | G01N 21/3563 |
| 2018/0356807 | A1* | 12/2018 | Honda | G05B 19/41885 |
| 2018/0373833 | A1* | 12/2018 | Merwin | G16B 20/20 |
| 2020/0176087 | A1* | 6/2020 | Colby | G06N 3/047 |
| 2020/0279148 | A1* | 9/2020 | Motoki | G16C 20/70 |
| 2020/0294630 | A1* | 9/2020 | Miller | G06N 3/045 |
| 2020/0349451 | A1* | 11/2020 | Suzuki | G06N 3/045 |
| 2021/0172800 | A1* | 6/2021 | Al-Haimi | G01J 3/0297 |
| 2021/0233621 | A1* | 7/2021 | Zavoronkovs | G09B 23/24 |
| 2021/0247360 | A1* | 8/2021 | Hayakawa | G01N 27/623 |
| 2021/0270744 | A1* | 9/2021 | Da Costa Martins | G01N 21/718 |
| 2021/0287137 | A1* | 9/2021 | Park | G06N 3/002 |
| 2022/0131998 | A1* | 4/2022 | Morovic | G06N 20/20 |
| 2022/0139504 | A1* | 5/2022 | Wiltschko | G16C 20/30 706/21 |
| 2022/0146418 | A1* | 5/2022 | Bauer | G01N 21/35 |
| 2022/0244173 | A1* | 8/2022 | Reimann | G01N 21/359 |
| 2022/0277815 | A1* | 9/2022 | Hosoumi | G06F 30/10 |
| 2022/0309815 | A1* | 9/2022 | Hamaguchi | G06V 30/12 |
| 2023/0100584 | A1* | 3/2023 | Diedam | G16H 20/10 706/25 |
| 2023/0194415 | A1* | 6/2023 | Reimann | G16C 20/30 250/252.1 |
| 2023/0251224 | A1* | 8/2023 | Hayakawa | G01N 27/623 250/282 |
| 2023/0352123 | A1* | 11/2023 | Atkinson | G16C 20/30 |

OTHER PUBLICATIONS

Gastegger et al., "Machine learning molecular dynamics for the simulation of infrared spectra." Chemical Science, 8, pp. 6924-6935 (2017).

Gómez-Bombarelli et al. "Automatic chemical design using a data-driven continuous representation of molecules," ACS Central Science, 4 pp. 268-276 (2018).

Jonas et al., "Rapid prediction of NMR spectral properties with quantified uncertainty." Journal of Cheminformatics, 11, 50, pp. 1-7 (2019).

Sousa-Silva et al., "Molecular simulations for the spectroscopic detection of atmospheric gases." Physical Chemistry Chemical Physics, 21, 35, pp. 18970-18987 (2019).

International Application No. PCT/US2021/044788, International Preliminary Report on Patentability, Mailed on Apr. 13, 2023, 10 pages.

Carbone et al., "Machine-Learning X-Ray Absorption Spectra to Quantitative Accuracy", Physical Review Letters, vol. 124, No. 15, 2020, 6 pages.

Jo et al., "The Message Passing Neural Networks for Chemical Property Prediction on SMILES", Methods, vol. 179, May 21, 2020, pp. 65-72.

International Application No. PCT/US2021/044788, International Search Report and Written Opinion, Mailed on Nov. 19, 2021, 14 pages.

Scott et al., "Identification of Plastic Waste Using Spectroscopy and Neural Networks", Polymer Engineering and Science, vol. 35, No. 2 Available Online at: https://onlinelibrary.wiley.com/doi/epdf/10.1002/pen.760351208, Jun. 1995, pp. 1011-1015.

Strieth-Kalthoff et al., "Machine Learning the Ropes: Principles, Applications and Directions in Synthetic Chemistry", Chemical Society Reviews, vol. 49, Issue 17 Available Online at: https://pubs.rsc.org/en/content/articlepdf/2020/cs/c9cs00786e, Jul. 16, 2020, pp. 6154-6168.

Wei et al., "Predicting Electron-Ionization Mass Spectrometry using Neural Networks", Cornell University Library, Nov. 21, 2018, 12 pages.

* cited by examiner

TECHNIQUES FOR PREDICTING THE SPECTRA OF MATERIALS USING MOLECULAR METADATA

FIELD

The present disclosure relates to spectroscopy, and in particular to techniques for prediction of characteristic spectra from structural descriptions of materials for material characterization.

BACKGROUND

Plastic products are predominantly single-use and frequently not recycled. Annual production of plastic worldwide is approximately 350 million tons, of which approximately 10% ends up being recycled, 12% is incinerated, and the remainder (78%) accumulates in landfills or the natural environment, where it takes nearly 500-1,000 years to degrade. Plastic production is expected to double by 2030 and triple by 2050. Recycling processes depend on accurate material characterization, sorting, and decomposition yield prediction.

Vibrational spectroscopy is one approach to characterize the interaction of matter with light, and affords a technique for identifying a material by a unique pattern of spectral features. Covalent bonds between constituent atoms in a molecule absorb infrared (IR) radiation at characteristic frequencies. The different vibrations of the different functional groups in the molecule give rise to spectral features, such as peaks and bands, of differing intensity. Another factor that determines the feature intensity in infrared spectra is the concentration of molecules in the sample. As a result, many materials exhibit a characteristic absorbance pattern in the infrared spectrum, which can be measured by spectroscopy and can be used to identify the material. Identification of materials by IR spectroscopy forms the foundation of many analytical techniques in materials processing, such as material sorting. For example, an unidentified material is characterized by IR radiation to generate a characteristic absorbance spectrum, which is then compared to a library of characteristic absorbance spectra for known materials to find a match. The match involves evaluating a fit across multiple features in terms of both energy and intensity. In some cases, as when intensity-calibrated instruments are used, the composition of the unidentified material can also be determined from IR spectroscopy. Unfortunately, chemical spectral databases typically contain data for pure substances or precisely quantified mixtures of industrial or scientific importance. Contaminated materials and complex blends are less frequently included. When characteristic spectra are unavailable, prediction of chemical composition of non-standard materials, such as waste materials, becomes much more difficult.

SUMMARY

Techniques are provided (e.g., a method, a system, non-transitory computer-readable medium storing code or instructions executable by one or more processors) for predicting vibrational spectra of molecular components incorporated in waste materials, using machine learning (ML) models implemented in deep learning networks.

In particular, techniques may be directed to generating encoded representations of chemical structures from text strings including structural information for constituent materials making up a waste material. The techniques may include one or more ML implementations including, but not limited to, natural language processing (NLP) using one or more approaches for sequence encoding. The ML implementations may be trained to predict latent chemical bond information describing spectroscopically active bonds in a material. The latent chemical bond information, in turn, may be mapped to spectrum information by a mapping function.

In some embodiments, a method is provided for generating spectroscopic data. The method includes inputting, by a computing device, a text string comprising a structural representation of a material to an encoder of a natural language processing (NLP) model implemented with a deep neural network. The method includes generating, using the encoder of the NLP model, an encoded representation of the text string. The text string may include latent chemical bond information of the material. The method includes mapping, by the computing device, the encoded representation including the latent chemical bond information to a spectrum array, the spectrum array including predicted spectroscopic data of the material. The method also includes outputting, by the computing device, the spectrum array.

In some embodiments, the method also includes receiving a chemical identifier of the material and accessing, from a database of structural representations, the text string using the chemical identifier. The text string may be or include a SMILES string. The NLP model may be or include a recurrent neural network model or a transformer model.

In some embodiments, the text string is a first text string, the material is a first material, the encoded representation is a first encoded representation, and the spectrum array is a first spectrum array, and the method includes inputting a second text string including a structural representation of a second material to the encoder of the NLP model, the second material including an additive. The method includes generating, using the encoder of the NLP model, a second encoded representation of the second text string including latent chemical bond information of the second material. The method includes mapping the second encoded representation to a second spectrum array including predicted spectroscopic data of the second material. The method includes generating a combined spectrum array using the first spectrum array and the second spectrum array. The method also includes outputting the combined spectrum array.

In some embodiments, the method also includes processing the encoded representation to select an incomplete subset of the latent chemical bond information. Mapping the encoded representation may include mapping the incomplete subset of the latent chemical bond information to a plurality of characteristic features in the spectrum array.

In some embodiments, the predicted spectroscopic data of the material comprises predicted wavelength and intensity information of a plurality of spectral features corresponding to the latent chemical bond information.

In some embodiments, the method also includes obtaining a plurality of chemical structure strings and a plurality of corresponding spectrometry data. The method also includes pre-processing the plurality of spectrometry data, wherein the pre-processing comprises (i) identifying a plurality of bonds in the plurality of chemical structure strings, and identifying one or more bands of interest in each spectrometry data set; and (ii) labelling a plurality of spectral features in each band of interest with chemical bond information corresponding to the plurality of bonds identified in the plurality of chemical structure strings. The method also includes inputting a batch of chemical structure strings from the plurality of chemical structure strings into the encoder of the NLP model in a training process. The method also includes adjusting weights and biases of the encoder in response to the training process. The method also includes repeating the inputting and adjusting, and estimating using other batches of chemical structure strings until (i) a predetermined number of batches of chemical structure strings are processed or (ii) all the chemical structure strings are processed.

In some embodiments, the method also includes multi-dimensional vector of wavelength and intensity describing a characteristic spectrum of the material outputting the spectrum array to a material characterization system of a chemical recycling process, enabling the material characterization system to identify the material as an input feedstock.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed may be resorted to by those skilled in the art, and that such modifications and variations are considered to be within the scope of this disclosure as defined by the appended claims.

Figure 1:
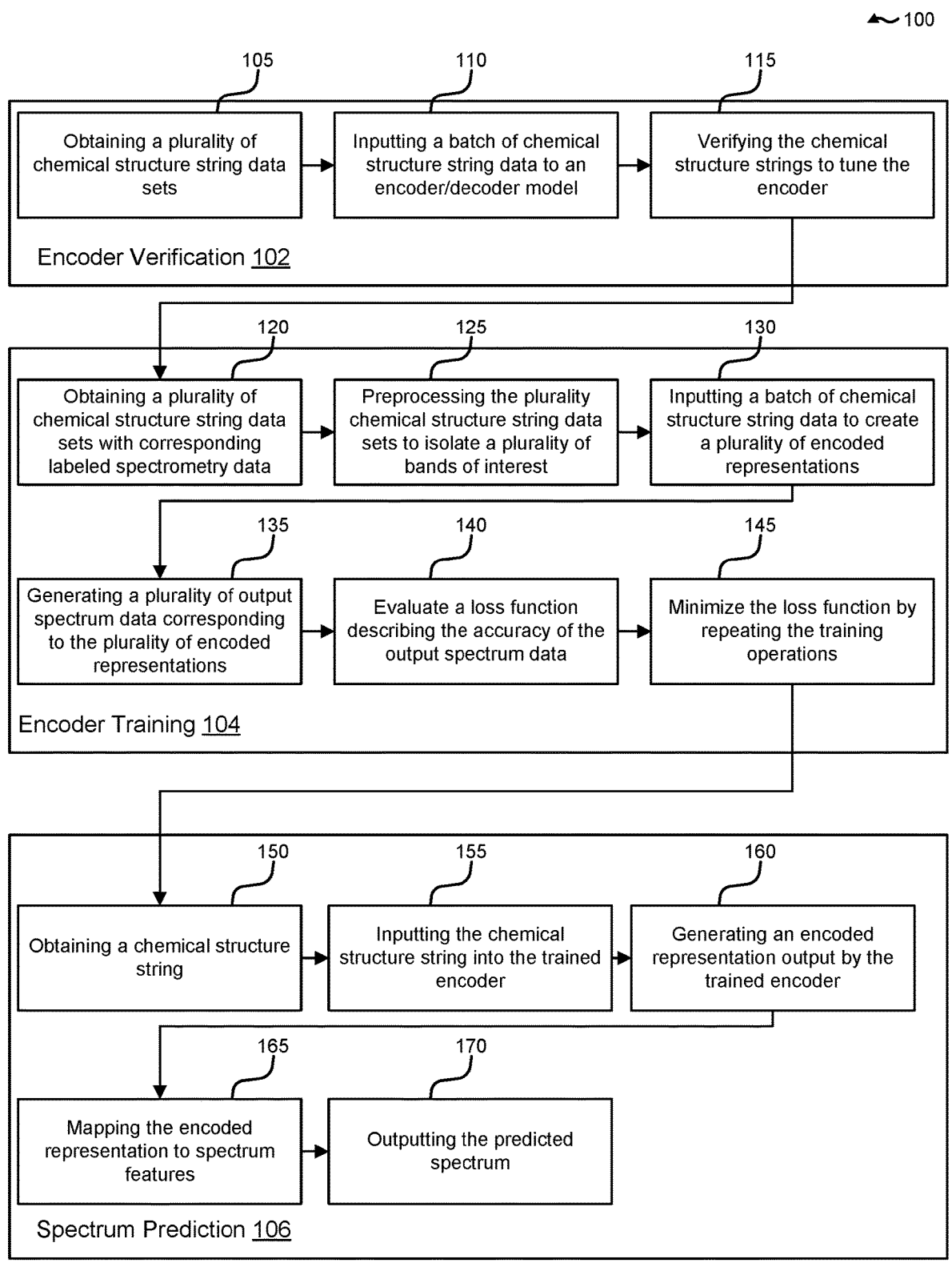
FIG. 1 illustrates an example workflow for predicting characteristic spectra of a material, in accordance with some embodiments of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

I. Introduction

Mechanical recycling, which describes physical processing to reuse or reform waste materials, is limited in its applicability to mixed, composite, and contaminated waste streams. For example, mechanical recycling typically employs mechanical separation and reformation processes that are insensitive to chemical contaminants and may be unable to modify the chemical structure of waste material. Chemical recycling may resolve the limitations of mechanical recycling by breaking the chemical bonds of waste materials into smaller molecules. For example, in the case of polymeric materials, chemical recycling may provide an avenue to recover oligomers, monomers, or even basic molecules from a plastic waste feedstock. In the case of polymers, chemical recycling processes may include operations to depolymerize and dissociate the chemical makeup of a complex plastic product, such that by-products can be up-cycled into feedstocks for new materials.

While example embodiments described herein center on polymeric materials or organic chemical materials, these are meant as non-limiting, illustrative embodiments. Embodiments of the present disclosure are not limited to such materials, but rather are intended to address material processing operations for which a wide array of materials serve as potential feedstocks for a material recycling and/or upcycling process. Such materials may include, but are not limited to, metals, glass, bio-polymers such as ligno-cellulosic materials, visco-elastic materials, minerals such as rare earth containing materials, as well as complex composite materials or devices.

Elements of chemical recycling may permit a material to be repeatedly dissociated into primary feedstock materials. In this way, rather than being limited by chemical structure and material integrity to a limited number of physical processes, as in mechanical recycling, the products of chemical recycling may include basic monomers (ethylene, acrylic acid, lactic acid, vinyl, etc.), feedstock gases (carbon monoxide, methane, ethane, etc.), or elemental materials (sulfur, carbon, etc.). As such, chemical recycling may permit improved implementation of reuse and recycling strategies based on chemical conversion of a waste material.

Successful implementation of chemical recycling may rely at least in part on accurate identification of waste feedstocks by spectroscopic characterization. Vibrational spectroscopy is one approach to characterizing the interaction of matter with light, and affords a technique for identifying a material by a characteristic pattern of spectral features. Chemical spectral libraries or databases typically contain data for pure substances or precisely quantified mixtures. While characteristic spectra may suffice to identify the core components of a high-purity waste material, the presence of contaminants or additives may interfere with spectroscopic characterization. Furthermore, some less commonly used materials, contaminated materials, and blends are less frequently included in spectral libraries or databases. When characteristic spectra are unavailable, prediction of chemical composition of non-standard materials, such as waste materials, becomes much more difficult.

As used herein, a spectrum can describe an emission spectrum or an absorbance spectrum. An emission spectrum can show radiation intensity as a function of wavelength, as generated by measuring radiation output by a radiation source. By contrast, an absorbance spectrum describes an intensity of absorption of radiation by a material as a function of energy, which can be expressed as frequency, wavelength, wavenumber, or energy, and can correspond to radiation reflected or transmitted by the material. In the context of chemical spectral libraries or databased described above, absorbance spectra can describe the characteristic pattern of spectral features for non-emissive materials.

The correct identification of waste material components is of importance, at least because the presence of some additives or contaminants may render a waste material unsuitable for chemical recycling. For example, halogen-containing materials, such as chlorinated or fluorinated polymers, may produce corrosive byproducts during some chemical recycling processes, which may damage or destroy chemical recycling units. In this way, providing accurate predictions of characteristic spectral data when standard data are unavailable may permit improved identification of waste materials, and thus improved implementation of chemical recycling.

Machine learning (ML) approaches described herein provide a solution to the paucity of characteristic spectral information available for waste materials. Characteristic spectra for arbitrary waste materials are predicted by training an ML model to generate chemical bond information for spectroscopically active bonds and resonant modes. Predicted characteristic spectra, in turn, are used to identify real-world waste materials received at material processing facilities or to design tailored sensor devices for specific waste materials.

The techniques described herein improve recycling processes by providing predicted spectra that in turn permit the characterization of waste materials and the optimization of spectroscopic sensor designs for improved sorting, process design, and process optimization techniques. While prediction of characteristic spectra is possible from first principles, for example, by deriving resonant frequencies for bonds making up a chemical or by manual identification of spectroscopically active bonds, the implementation of ML approaches provides improved predictions. For example, derivation from first principles may be limited to simple materials without additives or impurities, while both analytical and manual approaches typically suffer from lack of scalability and a limited ability to predict interaction terms, such as interference and non-linear effects (e.g., non-adherence to the Beer-Lambert assumption). For example, first principles approaches involve non-linear growth in complexity with increasing molecule size and, as such, become computationally unfeasible to populate libraries of spectra for large molecules. By contrast, the ML approaches disclosed herein do not solve energy equations, but instead use standard structure string data, such as SMILES or InChI representations, as an input to a natural language processing (NLP) model, from which any number of predicted spectra may be generated for molecules of arbitrary size. Furthermore, while standard structure strings may lack structural specificity, with multiple different strings describing the same structure, such ambiguity is a strength of NLP approaches developed to process linguistic syntax. These ML approaches also address a limitation of conventional recycling methods that typically are devised to process relatively pure waste streams, with minimal contaminants.

One illustrative embodiment of the present disclosure is directed to a system that includes one or more data processors and a non-transitory computer readable storage medium containing instructions which, when executed on the one or more data processors, cause the one or more data processors to perform actions including inputting a text string comprising a structural representation of a material to an encoder of a natural language processing (NLP) model implemented in a deep neural network. The actions include generating, by the NLP model, an encoded representation of the text string comprising latent chemical bond information of the material, revealing, among other information, spectroscopically active bonds in the material. The latent chemical bond information includes information that is not described explicitly in the text string, including, but not limited to, covalently bonded hydrogen, structural conformations, or vibrational motion. The actions include mapping the latent chemical bond information to a spectrum array, the spectrum array including predicted spectroscopic data of the material such as energy or intensity information for characteristic spectral features of the material. Mapping may include several different approaches including, but not limited to, input/output mapping from a vector of bond multiplicity to the spectrum array, or ML approaches such as a sequence-to-sequence model. The actions may also include outputting the spectrum array. Uses of the spectrum array include, but are not limited to, populating a library for identification of unidentified materials in a sorting process or configuring sensor devices for application in recycling facilities.

Advantageously, these techniques can overcome the computationally intensive problem of first principles prediction, and provide accuracy and efficiency of predicting features of a characteristic absorbance spectrum directly from a structural representation of a material. The improved prediction of characteristic absorbance spectra that utilizes a machine learning component in accordance with the various embodiments discussed herein, greatly increases the number of combinations of materials that can be accurately identified by rapid spectroscopic measurement using customized IR sensors.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. As used herein, when an action is "based on" something, this means the action is based at least in part on at least a part of the something.

II. Techniques for Prediction of Characteristic Spectra of Materials

Figure 2:
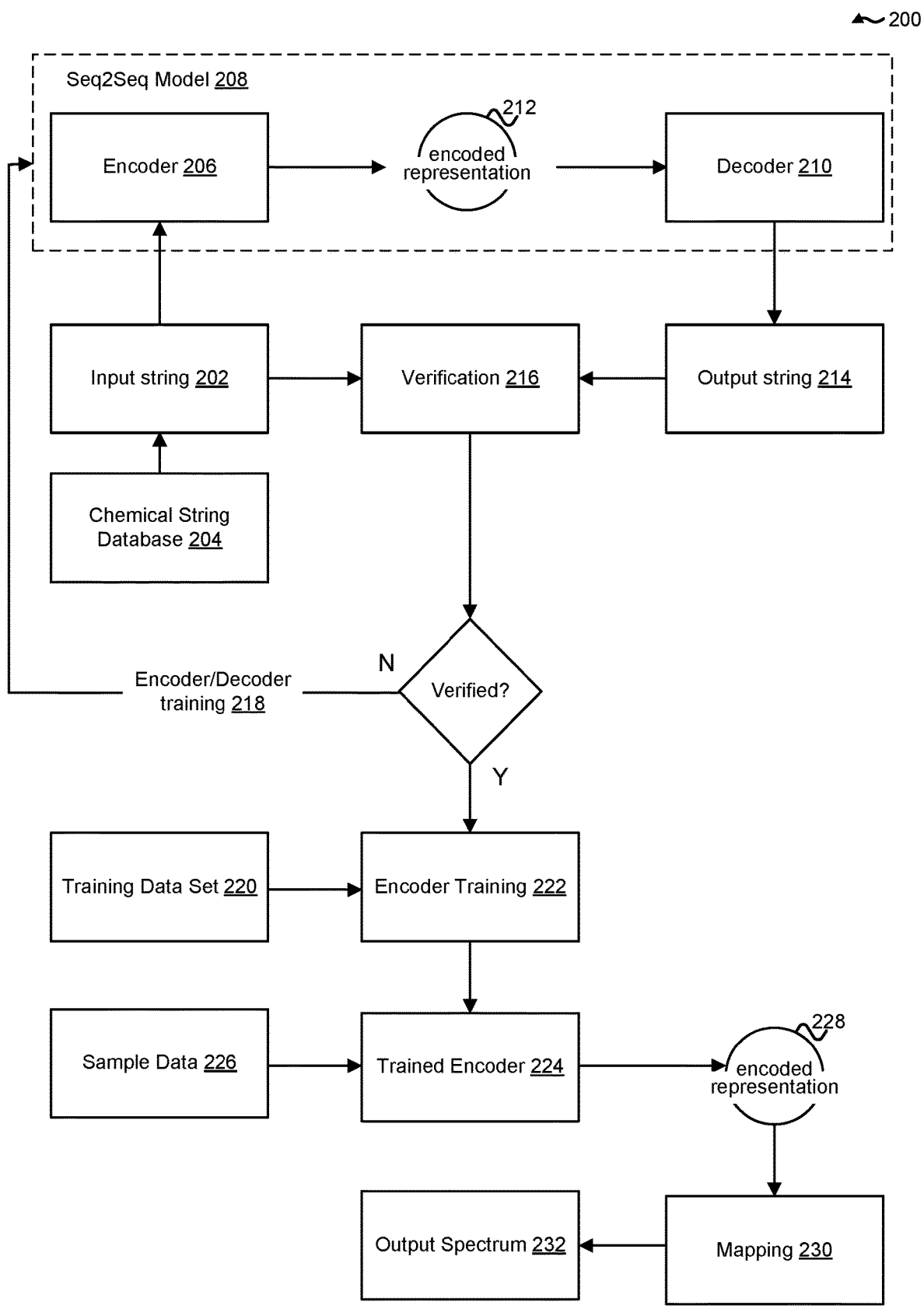
FIG. 2 illustrates an example workflow for training and using an encoder in an artificial neural network to predict characteristic spectra, in accordance with some embodiments of the present disclosure.
Figure 5:
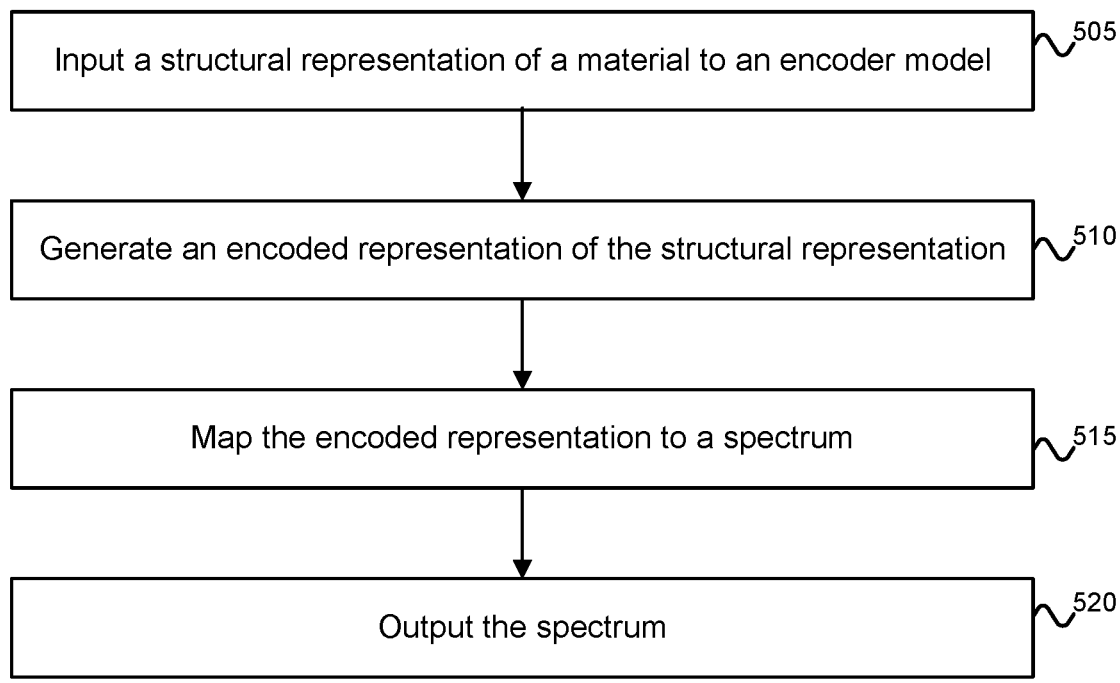
FIG. 5 illustrates an example flow describing a method for generating a predicted spectrum of a material, in accordance with some embodiments of the present disclosure.

FIGS. 1, 2 and 5 depict simplified flowcharts depicting processing performed for prediction of an characteristic spectrum of a material according to various embodiments. The steps of FIGS. 1, 2, and 5 may be implemented in the system environments of FIGS. 3 and 6, for example. As noted herein, the flowcharts of FIGS. 1, 2, and 5 illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combination of blocks in the block diagrams and/or flowchart illustration, can be implemented by special purpose hardware-based systems that perform the specified functions or acts, or combinations of special purpose hardware and computer instructions.

FIG. 1 illustrates an example workflow 100 for predicting characteristic spectra of a material, in accordance with some embodiments of the present disclosure. As shown in FIG. 1, the workflow 100 is subdivided into sub-processes including encoder verification 102, encoder training 104, and spectrum prediction 106. Encoder verification 102 includes various steps to train the encoder to process structural string representations of materials and to predict latent chemical bond information describing the materials, to be used to predict the characteristic spectra. As part of the encoder verification 102, at step 105, a plurality of chemical structure string data sets are obtained comprising structural representations of materials. In some embodiments, the plurality of chemical structure string data sets are obtained by a computing device from one or more private or public database sources, such as PubChem, ChemSpider, Reaxys, or the NIST. The private or public database sources may be a centralized, standards compliant, data repository for chemical structure data, including chemical identifiers or identification numbers, such as CAS numbers, chemical structures according to various structural representation formats, and supporting spectral evidence. Spectral evidence may include standard, uncalibrated, or intensity-calibrated vibrational spectra, such as FTIR-ATR spectra collected from pure-control samples or standard composites.

Numerous standard approaches exist for representing a chemical structure as a string. For example, the simplified molecular-input line-entry system (SMILES) is a specification in the form of a line notation for describing the structure of chemical species using short ASCII strings. SMILES strings are non-unique representations of a chemical structure, which permits a single chemical to be represented by a number of equally valid SMILES strings. SMILES strings can be derived algorithmically from a graph-representation of a chemical structure, such as those stored in chemical structure databases. In a first step, hydrogen atoms are removed from the structure and cycles are broken and represented as branches or sub-branches. Numerical suffix labels indicate nodes forming the termini of the broken cycles. Branching is indicated using parentheses, with nested parentheses used for sub-branches. In graph-based procedures, a SMILES string can be derived by identifying symbol nodes encountered in a depth-first tree traversal of a chemical graph.

In an illustrative example, as described in more detail in reference to FIG. 4, below, the chemical named 1-hexyne, a linear unsaturated alkyne with a structure $C_6H_{10}$, can be represented by a SMILES string as "CCCCC#C." As can be seen from the example, a SMILES string, as well as other structural representations (e.g., "InChI=1S/C6H10/c1-3-5-6-4-2/h1H,4-6H2,2H3"), may represent some structural information implicitly. For example, in the SMILES string representation of 1-Hexyne, hydrogen information, such as the number of hydrogens per node, is implied by the case of the node (e.g., "C" vs. "c") and the letter representing the element, from which valence information may be inferred. In the case of carbon, for example, the sequence "CC" implies three hydrogen atoms bonded to each carbon atom, the two carbon atoms sharing a single covalent bond. As another example, the sequence "CCC" implies only two hydrogen atoms bonded to the central carbon atom, and "c1ccccc1" implies only a single hydrogen atom bonded to each carbon, where the lower case indicates a cycle and the implied aromaticity leads to the prediction of a benzene $C_6H_6$ structure.

At step 110, a batch of the chemical structure string data may serves as an input to an encoder/decoder model making up a sequence-to-sequence model. The encoder, as described in more detail in reference to FIGS. 2-3, may form a part of the techniques described herein to predict characteristic spectra of materials, such as waste materials, for which spectral databases lack information. The batch may be selected from the plurality of chemical structure data sets by various approaches. For example, the plurality of chemical structure data sets may be pre-processed to filter materials of limited significance for materials processing facilities, such as proteins and other biological molecules. As another example, the batch of chemical structure string data may be selected to exclude data for complex materials, such as co-polymers or polycyclic aromatic hydrocarbons.

As described in reference to FIG. 2, below, a sequence-to-sequence model, implemented with an artificial neural network, such as a recurrent neural network (RNN) model or a transformer model with feed-forward neural network layers, may generate an encoded representation from an input chemical structure string. In some embodiments, the encoded representation can represent latent chemical bond information implied by the structural representation. In comparison to a sequence-to-sequence model for bi-directional translation of natural language, referred to as an NLP model, the encoder of an NLP model may generate a multiset of words including multiplicity information, as well as other latent information, such as weights or attention parameters. In the example of the NLP model, the encoded representation can represent a multi-dimensional vector representing the multiplicity of words from the input sequence as part of a vocabulary of words recognized and understood by the NLP model. In this way, the decoder of the sequence-to-sequence model can input the encoded representation and output a translated sequence of a different length. The translation may be predicted based on training the decoder in tandem with the encoder, to tune weights and biases of constituent cells making up the NLP model and/or to increase the vocabulary. Furthermore, by implementing short-term and long-term memory, more impactful words (e.g., subjects, verbs, objects, negations, etc.) are "remembered" or retained by the NLP model, while less impactful words are "forgotten" or not retained. Training the encoder or the decoder may include repeating the inputting and adjusting, and estimating using other batches of chemical structure strings until (i) a predetermined number of batches of chemical structure strings are processed or (ii) all the chemical structure strings are processed.

The chemical structure strings making up the batch of chemical structure string data can similarly be used to develop a vocabulary of chemical bond information, as part of training the encoder to treat chemical structure strings as a natural language. As an illustrative example, a variable-length string made up of the nodes and explicit bond information of a material (e.g., in a SMILES string) may be inputted to the encoder of the encoder/decoder to generate an output string. The encoder can generate an encoded representation as a fixed-length multidimensional vector of bond multiplicity, order, and structural position in reference to a starting point. In addition to the nodes, the encoded representation can include latent chemical bond information, such as information about hydrogens or cycles, as described above. While not focused on spectroscopically active bonds during encoder verification 102, verification of the encoder by string-to-string translation serves to develop the bond vocabulary and to train the encoder to identify and predict latent chemical bond information. As an illustrative example, an untrained encoder may be unable to distinguish between a SMILES string for hexane ($C_6H_{14}$), "CCCCCC," and that for cyclohexane ($C_6H_{12}$), "C1CCCCC1," where the numerical indicators represent opening and closing nodes for the cycle. From this example, it can be seen again that hydrogen information is not explicitly described in SMILES strings, and, as such, the encoder may be trained to predict correct latent chemical information by generating an encoded representation.

In step 115, the output of the encoder/decoder may be used to verify the accuracy of the encoder. Verification can include multiple possible approaches, including, but not limited to, training the decoder to recover the original structure sting used as an input to the encoder. As an example, a SMILES string may be used as the input to the encoder/decoder and the verification may include comparing the output to the input to verify accurate recovery. Verification may include a binary accuracy assessment, such as a true/false distinction, or it may include error propagation techniques to identify the source of error in the sequence encoder. In some embodiments, the encoder/decoder can generate outputs in alternative standard formats as an approach to verifying that the encoder is accurately predicting latent chemical bond information. For example, the output of the decoder may be a structure string describing hydrogens, stereochemistry, or other latent information not explicitly described in the input string. Verification, therefore, may include comparing the output string to the corresponding input string in the alternative structural representation format. As an illustrative example, hexane in SMILES string notation is: "CCCCCC," whereas the corresponding InChI format string is: "InChI=1S/C6H14/c1-3-5-6-4-2/h3-6H2,1-2H3," which includes the information about hydrogen number and structure that is implicit in the SMILES notation. As will be described in more detail below, accurate prediction of characteristic spectra implicates additional latent information, such as predictions of spectroscopically active bonds, bond motion (e.g., stretch, scissor, bend, etc.), and characteristic bonds that can be used to distinguish one material class or specific material from another.

Illustrated as part of encoder training 104, the encoder may be trained to predict latent chemical bond information implicit in the chemical structure strings that imparts spectroscopic features and characteristics to a material class or a constituent material of the material class. In step 120, a plurality of chemical structure string data sets may be obtained with labeled spectrometry data. While the plurality of chemical structure string data sets may be different from the data obtained as part of step 105, as described above, the data obtained for the purpose of encoder verification may also include spectrometry data and, as such, may be used for the purpose of encoder training as well. The labeled spectrometry data may include vibrational spectra of a plurality of materials. The labels may include metadata, such as structure string information, material classifications, or unique numerical identifiers (e.g., CAS numbers). In some embodiments, the spectrometry data describe characteristic spectral features, for example, a pattern of peaks or bands in an absorbance spectrum by which a material can be identified. As described in more detail in reference to FIG. 4, below, the features may be formed by bonds between various atoms, between different types of bonds, or by different types of bond motion, as well as other factors.

In some embodiments, the plurality of chemical structure string data sets may correspond to multiple material classes. In the case of polymeric materials, for example, monomer chemical structure strongly influences the characteristic spectrum of the overall material. As such, a class of polymers including variants on a basic polymer backbone, such as polyethylene, polypropylene, polystyrene, or polyvinyl, may be identified by the characteristic features of the monomer. Structures such as sidechains, functional groups, or copolymers, may add features or modify the features produced by the polymer backbone. In this way, the specific features may distinguish a specific material from the class type and allow the encoder to be trained to separate those features.

Class-level identification may permit coarse sorting of materials as, for example, during intake of waste materials for a chemical recycling process. By contrast, fine sorting based on material-specific features can be used, among other applications, to reject some forms of the base material from others based on process restrictions of a chemical recycling process. As an illustrative example, cross-linked polyethylene (XLPE) is a thermosetting resin with three types of cross-linking: peroxide cross-linking, radiation cross-linking, and silane cross-linking. The polymer can be effectively recycled when the cross-linking points are decomposed chemically, but is not directly mechanically recycled, due in part to its phase-transition properties. Low density polyethylene (LDPE), by contrast, may be recycled mechanically because it presents different thermal properties that allow it to be melted and reformed without chemical decomposition. In this example, cross-linking extent is detectable in vibrational spectra, at least because spectra for LDPE and XLPE include different and distinguishable features. Furthermore, where some features are shared between LDPE and XLPE spectra, relative intensity of shared features may differ between the two materials. The example of LDPE and XLPE demonstrates that two polymers of similar monomer chemistry, differing mainly in hydrogen content that is included latent chemical bond information omitted from structural representations, may be treated differently by chemical recycling processors and may be detected by their characteristic spectra.

At step 125, encoder training 104 includes pre-processing and other data preparation steps applied to the plurality of chemical structure string data sets obtained at step 120. For a spectrum of the labeled spectrometry data, pre-processing includes identifying bands of interest for the material described by the spectrum. Bands of interest describe a wavelength range of a spectrum within which characteristic features are found for the material. For example, as described in reference to FIG. 4, an FTIR absorbance spectrum will include various features, of which some will describe a specific material, some will be characteristic of a class of materials, while others will be common instrument artifacts, such as a feature introduced by carbon dioxide in air, commonly detected at 2341 $cm^{-1}$. Pre-processing of spectral data can include the characteristic features as the bands of interest. Pre-processing can also include labelling features, such as peaks or bands, for use during training, such as supervised training or by reinforcement learning.

As shown in steps 135, 140, and 145, in some embodiments, the encoder training 104 includes, for each input (X), performing a feed-forward pass on each intermediary layer (e.g., LSTM cells, hidden layers, fully connected layers, etc.) of the encoder to compute the outputs of each layer, then at the output layers to obtain a final output (X'). This is illustrated at step 135, which encompasses a process of generating a plurality of spectrum prediction data using pre-processed chemical structure string data as inputs to the verified encoder. Encoder training may also include, at step 140, evaluating a loss function. Evaluating the loss function may include measuring a deviation between the final output (X') and the input targets (X), e.g., using a loss function such as squared root or mean-squared error, and calculating an error value for one or more nodes, cells, neurons, or layers within the encoder-decoder network. Evaluating the loss function may include back propagating each error value back through the encoder starting from the final output (X') until each node, cell, neuron, or layer has an associated error value which roughly represents its contribution to the final output (X') and calculating a gradient of the loss function using the associated error values.

At step 145, weights and biases of the encoder-decoder network may be adjusted in response to the first training process. In some embodiments, adjusting the weights and biases includes feeding the gradient of the loss function calculated in step 140 into an optimization process, which updates or adjusts the weights and biases for the one or more nodes, cells, neurons, or layers in an attempt to minimize the loss function. Accordingly, as the encoder is trained, the nodes, cells, or neurons in the intermediate layers organize themselves in such a way that the different nodes, cells, or neurons learn to recognize different characteristics of the total input space. After training, when an arbitrary input pattern is present which contains noise or is incomplete, the nodes, cells, or neurons in the hidden layers of the network will respond with an active output if the new input contains a pattern that resembles a feature that the individual nodes, cells, or neurons have learned to recognize during their training. Optionally, the first training process may further include a pre-training process to determine initial weights and biases for the one or more nodes, cells, neurons, or layers that approximate the final solution to avoid potential problems with the backpropagation of the error values. In certain embodiments, as when the output spectrum data is generated using a decoder, the encoder and the decoder may share weights and biases, use different sets of weights and biases, or include a combination of similar and different weights and biases.

Optionally, encoder training 104 may include the output steps of spectrum prediction, whereby the encoded representations generated by the encoder are mapped to spectral features. In such cases, the predicted spectral features may be compared to labeled spectra in the training data. Accuracy and error information may therefore describe additional aspects including, but not limited to, wavelengths of characteristic features, the relative intensity of the features, or peak-width (e.g., full-width at half max (FWHM)).

In some embodiments, the trained encoder is applied to arbitrary chemical structure strings as part of the spectrum prediction 106 process. At step 150, chemical structure strings may be obtained from the public or private libraries described above in reference to step 105, from entries lacking a standard FTIR spectrum or labeled spectral feature data. In some embodiments, the chemical structure strings can be grouped according to material classification. Grouping may be based, in some cases, on metadata or by pre-processing, and may permit improved prediction through correlation with the bands of interest, described above, for the corresponding group. Grouping may also help elucidate material classifications for which the encoder training may be improved, for example, as part of reinforcement learning or model validation. Advantageously, grouping or other data preparation approaches may also permit the encoder to learn to predict spectra for more complex materials, such as block copolymers, metalorganic complexes, or biopolymers, such as ligno-cellulosic materials. The differentiation between material classifications and constituent materials within material classifications by spectral information is described in more detail in subsequent paragraphs.

At step 155, the structure strings are input to the encoder, as described in more detail in reference to FIG. 3, below. In short, inputting a structure string can include describing each character (e.g., node, bonds, branch indicators) in the structure string as an input state to a discrete cell of the encoder. In some embodiments, the output state of each cell is an encoded representation including latent chemical bond information, based in part on the input state and the output state of the preceding cell. In the context of a sequence encoder, the output state is a hidden state. At step 160, the final output state of the encoder, generated by the terminal cell of the encoder includes latent chemical bond information for the entire chemical structure string and, as such, can be used to predict spectral features resulting from a holistic understanding of the chemical structure of the material. At step 165, the final output state of the encoder may serve as the encoded representation to be used for mapping onto spectral features, as described in more detail below, in reference to FIG. 3. Mapping may include a simple input/output mapping, for example, by mapping the encoded representation to an array of spectral features and intensities, thereby producing a multi-dimensional array of feature position in terms of wavelength as well as relative intensity, normalized to the intensity of the most prominent feature.

Once generated, the predicted spectrum may be output as part of step 170. Outputting may describe automatic operations of a computer system that include various uses of the predicted spectrum. For example, step 170 may include storing the predicted spectrum in a library of material spectra, to be used as a reference for identifying waste received at materials recycling facilities. Similarly, the predicted spectra may serve as inputs to other systems, such as a sensor system configured to interrogate and characterize diverse materials. Step 170 may be implemented in the framework of chemical recycling or material processing systems. For example, the predicted spectrum may be output to a material characterization system to be used in sorting materials. The predicted spectrum may be used to identify a material class, such as a polymer type, as an initial, or "coarse" sorting of materials. The predicted spectrum may be used to distinguish a material from other materials within the same class, as a secondary, or "fine" sort. The predicted spectrum may include information permitting a material characterization system to identify additives or impurities and, as such, may be used to screen materials for impurities and thereby prevent impurities from entering the chemical process units making up the chemical recycling system.

FIG. 2 illustrates an example workflow 200 for training and using an encoder in an artificial neural network to predict characteristic spectra, in accordance with some embodiments of the present disclosure. The blocks included in the workflow 200 represent operations that may be implemented by a computer system as autonomous or semi-autonomous processes. For example, the workflow may include obtaining an input string 202 from a chemical string database 204. As described in reference to FIG. 1, the chemical string database 204 may include standard information databases storing chemical structure strings for large numbers of chemicals relevant to chemical recycling processes. The input string 202 can serve as an input to an encoder 206 forming part of a sequence-to-sequence model 208. The sequence-to-sequence model 208 can be an example of the encoder/decoder network described in reference to FIG. 1. In some embodiments, the encoder 206 and a decoder 210 are NLP models implemented as recurrent neural network models or transformer models.

An RNN is a neural network with loops in it, allowing information to persist. Long Short Term Memory (LSTM) networks are a special kind of RNN, capable of learning long-term and short-term dependencies (e.g., the gap between where relevant information was discovered in the network and the point where the relevant information is needed in the network to predict the next object). As used herein, a "long short term memory cell" is a unit of a recurrent neural network comprising multiple interacting layers that can keep a piece of information for long or short periods of time during work and protect the gradient inside the cell from detrimental changes during the training. For example, a LSTM cell may comprise three gates (input, forget, output), and a cell unit. The gates may be configured to use a sigmoid activation, while input and cell state may be transformed with the hyperbolic tangent, or tan h function. As used herein, a "gradient recurrent unit cell" is a unit of a recurrent neural network that modulates the flow of information inside the unit, however, without having a separate memory cell. The activation of the GRU cell at time t is a linear interpolation between the previous activation and the candidate activation where an update gate decides how much the unit updates its activation, or content. This procedure of taking a linear sum between the existing state and the newly computed state is similar to the LSTM cell. The GRU cell, however, does not have any mechanism to control the degree to which its state is exposed, but exposes the whole state each time.

A transformer model is a deep learning model that can take an input (typically sequential data such as natural language text) in the form of a sequence of vectors, and converts the input data into a vector called an encoding, and then decodes the vector back into another sequence. The encoder portion includes a set of encoding layers that processes the input iteratively one layer after another. Similarly, the decoder portion includes a set of decoding layers generating an output sequence, using the output of the encoder as an input. The output of the encoder portion contains latent information from the input sequence that permits the decoder portion to generate the output sequence. Transformer models may be trained using semi-supervised learning, such as multi-stage training procedures involving unsupervised pre-training followed by supervised fine-tuning. Pre-training may include a much larger training dataset than what is used for fine-tuning, as when labeled training data is less readily available.

Each encoder layer generates encodings from input embeddings. Embeddings are vectors generated from the input vectors by the first encoder layer of the encoder portion. In the context of structural representations of materials, the inputs could be vector representations of individual nodes or structural characters, such as a letter indicating an element, a bond indicator, a parenthesis, or a punctuation mark. Each encoder layer receives a list of vectors (either the input sentence or an embedding, depending on the position of the encoder layer in the encoder stack) that it processes by passing the vectors into a self-attention layer, followed by a feed-forward neural network. The output of the feed-forward neural network is passed into the subsequent encoder layer and to the corresponding decoder layer, as described below. The output of the final encoder layer of the encoder portion is passed to each layer of the decoder portion. The encodings also contain positional information describing the order of each input vector in the input sequence, such as the position of constituent words in a natural language sentence. The positional information permits the encoder to account for ordering of the sequence components.

The general process undertaken by each self-attention layer includes (i) taking in an input including a list of fixed-length vectors (the input can be an embedding or an encoder output); (ii) splitting the input into a set of query, key, and value matrices by multiplying the input by a set of weight matrices, where each set includes a query weight matrix, a key weight matrix, and a value weight matrix; (iii) calculating an equivalent number of attention matrices using the query, key, and value matrices for each set of weight matrices; and (iv) concatenating the attention matrices to produce the output of the attention layer. The output of the attention layer is a matrix including a vector for each entry in the input sequence. This matrix serves as the input of the feed-forward neural network. Furthermore, at each sub-layer, residual connections and sub-layer normalization operations can be implemented to reduce the difficulty of training the layers.

Decoder layers implement similar structures to those described above in reference to encoder layers. For example, a decoder layer includes a self-attention layer and a feed-forward neural network. The decoder layers take in encodings from the final encoder layer as an input into the self-attention layer, as well as the output of the corresponding encoder layer into an additional encoder-decoder attention layer (e.g., the first encoder layer passes its output to the second encoder layer and the first decoder layer). To focus the decoding layer on the relational structure of the input, the "encoder-decoder attention" layer works just like the self-attention layer of the encoder portion, except that the query matrices are produced from the preceding decoder layer, while the key and values matrices are produced from the output of the final encoder layer.

In various embodiments, the encoder 206 maps a variable-length source sequence such as the input string 202 to an encoded representation 212, which includes a fixed-dimensional vector representation, and the decoder 210 maps the encoded representation 212 back to a variable-length sequence, such as an output chemical structure string 214.

The sequence-to-sequence model 208 may comprise the encoder 206 including a recurrent neural network of LSTM cells or GRU cells or a stack of encoder layers within a transformer. In some embodiments, the encoder portion 206 takes the input string 202 (a variable-length source sequence), which in step 110 is a string from a batch of chemical structure string data of the verification data set, and maps the input sequence 202 to the encoded representation 212 (fixed-dimensional vector representation) of the sequence. In certain embodiments, the encoded representation 212 of the input sequence 202 may include a n-dimensional vector of the batch of latent chemical bond information from the data set.

The encoder 206 may include a bidirectional RNN or a bidirectional transformer. Unlike feed-forward models, bidirectional models utilize both the previous and future context, by processing the data from two directions with two separate hidden layers. One layer processes the input sequence in the forward direction, while the other processes the input in the reverse direction. The output of a current time step is then generated by concatenating a vector from each hidden layer. Accordingly, for every point in a given sequence, the encoder portion 206 has complete, sequential information about all points before and after it, and is capable of reading the input sequence 202, one time step at a time, to obtain the encoded representation 212. Also, because the encoder portion 206 is free to use as much or as little of this context as necessary, there is no need to find a (task-dependent) time-window or target delay size.

While the encoder 206 has been described at some length and with some particularity with respect to the sequence-to-sequence model 208 including an RNN or stack of encoder layers within a transformer and a decoder portion 210 including an RNN or stack of decoder layers within a transformer, it is not intended to be limited to only those embodiments. Instead, it should be understood the sequence-to-sequence model 208 described herein is an exemplary embodiment, and that the encoder 206 is to be construed in the broadest sense to include variations of the specific design and/or performance need described herein, as well as other variations that are well known to those of skill in the art. In some embodiments, the encoder-decoder network 200 is an ensemble of neural networks that includes at least two neural networks combined to create a learning paradigm or model to solve the problem of predicting a characteristic FTIR absorbance spectrum from chemical structure string data. For example, significant improvement in performance has been seen when multiple (up to 50) neural networks are trained with the encoder-decoder architecture described herein. In certain embodiments, the ensemble is implemented using a specific number and/or type of neural networks from a possible pool or group of neural networks. The results from training each of the neural networks (i.e., the component predictions) may then be combined using plurality voting or majority voting for classification tasks, and averaging or weighted averaging for regression tasks.

As described above, model verification 216 may include comparing the output string 214 to the input string 202, as part of training the encoder 206 portion of the sequence-to-sequence model 208 to process the input string 202 and predict latent chemical bond information. Verification 216 can include a simple comparison of the strings, conversion of strings to vector representation and determining a difference vector, or other approaches to verifying accuracy. In some embodiments, the output string 214 may take the form of a different structural representation, in which case the sequence-to-sequence model 208 may be said to be acting as a bi-directional translator between two representation formats for the same chemical structure (e.g., SMILES and InChI). In some embodiments, verification 216 is iterative, such that encoder/decoder training 218 may be applied to the sequence-to-sequence model 208. Training the sequence-to-sequence model 208 may include, but is not limited to, providing additional input strings, batches of input strings, or re-introducing the same input string as part of training the encoder 206.

In some embodiments, the encoder 206 is trained using a training data set 220 including labeled characteristic spectra of materials collected from a database of spectral information. Encoder training 222 may include training the encoder 206 to predict latent chemical bond information that maps to characteristic spectra for material classifications, a specific material, contaminants, additives, or other levels of characterization, corresponding to the intended use of the encoder 206. Encoder training 222 may also include vocabulary building operations to help the encoder 206 learn to identify bonds and structures from structural representations in the training data set 220. The concept of vocabulary, originating in NLP treatments of human language, in this context refers to training the encoder 206 to identify spectroscopically active bonds either explicitly stated or implied in a structural representation.

As opposed to spectroscopic measurements of real-world samples, predicted spectra may include a reduced feature-set to facilitate identification of a given material, rather than reproducing the exact spectrum of the material. For example, a trained encoder 224 may be configured to predict chemical bond information that maps to characteristic spectral features descriptive of the class of a material based on its chemical structure string (e.g., polymer type). The trained encoder 224 may also be configured to predict the chemical bond information that maps to specific identifying spectral features descriptive of the material, from which the material can be distinguished from other materials of the same class. As an illustrative example, polyethylene-type polymers may be functionalized with different side-chains or functional groups, such that an absorbance spectrum of a functionalized polymer can contain features introduced by the polymer backbone, which will be common to all polyethylene-type polymers, as well as features specific to the side-chains or functional groups. In some embodiments, therefore, the trained encoder 224 is trained to predict those features that would distinguish one polymer from another within a specific polymer type, as well as distinguishing one polymer type from another.

The system implementing the trained encoder 224 may obtain sample data 226 from which to generated encoded representations 228. The sample data 226 can be categorized by material classification, for example, when the trained encoder 224 has been trained to predict spectra for materials within a specific material classification. The sample data 226 can be obtained from material databases, such as those described above in reference to FIG. 1, for example, where the entry for the material lacks a characteristic spectrum. Once generated, the encoded representation 228 may serve as an input to a mapping 230 function.

Mapping 230 describes various operations including, but not limited to, input/output mapping using vector operations, machine learning models implemented in artificial neural networks trained to generate predicted spectral features from the encoded representation 228, or pre-processing operations to reduce the size of the encoded representation 228. For example, the pre-processing operations can select an incomplete subset of the latent chemical bond information to isolate particular resultant features for a given application, such as distinguishing the material class of the material or identification of the material from others in the same class.

The product of mapping 230 includes an output spectrum 232, which can be represented as a spectrum array object. The output spectrum 232, as an array of data including wavelength and intensity information and other metadata, may take various forms, including, but not limited to, a data file stored in a library of predicted spectra, a visualization file including graph data for the predicted spectrum, or other data format that can be used to configure a sensor to identify the material from which the output spectrum 232 was predicted. In this way, multiple output spectra 232 may be generated and stored to populate the library of predicted spectra using the same trained encoder 224, a detailed example of which is described in reference to FIG. 3, below.

Figure 3:
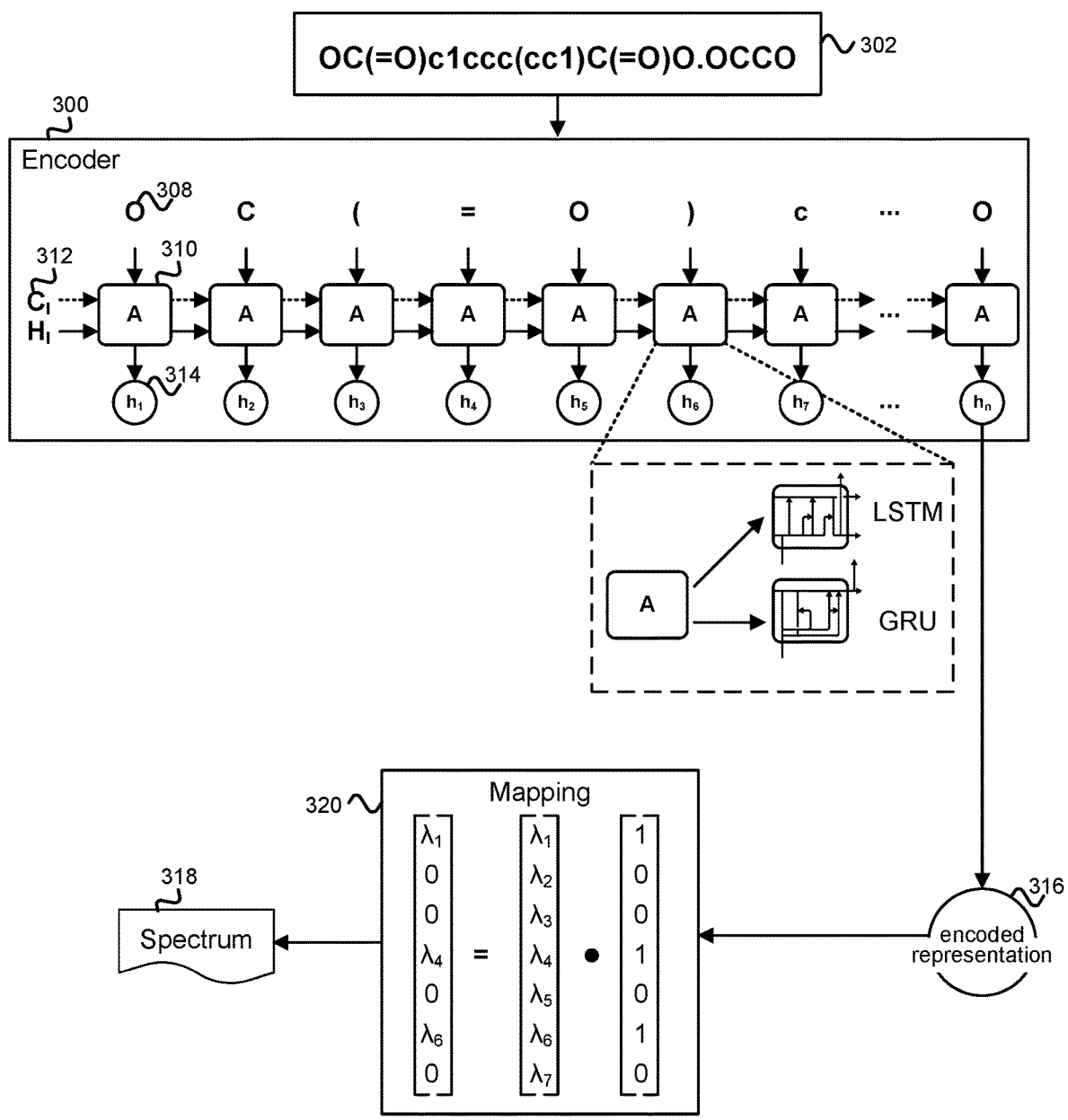
FIG. 3 illustrates predicting a characteristic spectrum of a polymer using an encoder of a recurrent neural network in accordance with some embodiments of the present disclosure.

FIG. 3 illustrates predicting a characteristic spectrum of a polymer using an encoder 300 implemented in an artificial neural network, in accordance with some embodiments of the present disclosure. As an illustrative example of the techniques described in reference to FIGS. 1-2, FIG. 3 describes an encoder 300 receiving as an input string 302 a structure string 304 describing a chemical structure 306 of a monomer unit of polyethylene terephthalate (PET). PET is a commodity material that makes up a large portion of plastic waste and is one of the most recycled thermoplastics, having the number "1" as its recycling symbol. PET is thoroughly characterized and its multiple different grades and forms are described in chemical databases. PET is illustrated in FIG. 3, however, because the structure 306 of the PET monomer includes hydrogen atoms, branches, an aromatic cycle, and, as such, the corresponding structure string 304 (e.g., a SMILES string, as shown in FIG. 1) includes uppercase nodes, lowercase nodes, branch characters, cycle terminus numerals, bond characters, and punctuation to indicate specific group configurations.

In some embodiments, the order of characters in the structure string 304 references an arbitrary starting node. In the case of the structure 306 of PET, the starting node is the left-most oxygen atom within the monomer unit. As previously described, SMILES strings omit hydrogen atoms, and, as such, the structure string 304 does not include "H." For the input 302 to the encoder 300, each character or numeral can be provided as an input state 308 to cell 310 of the encoder 300, which may include an arbitrary number of cells 310 corresponding to the variable length of the input string 302. As described previously, the encoder 300 may be an implementation of an RNN, for which the cells 310 may include LSTM cells or GRU cells, among other approaches to context-sensitive sequence encoding.

Each cell 310 receives an input state, a cell state 312, and a hidden state 314 from a preceding cell 310 in the neural network. For the first cell of the cells 310, corresponding to a first time step in terms of memory, an initial cell state and initial hidden state are provided to the first cell. LSTM cells and GRU cells differ in that GRU cells do not pass a cell state 312. The hidden state 314 passed to the subsequent cell 310 facilitates information retention and provides the capability for the encoder 300 to identify latent chemical bond information. For example, hydrogen information can be predicted based on the information of a node itself, such as valence states of the element represented in the node. In contrast, cycles and branches may involve retention of information, such as ring terminus numerals, across multiple cells. For the encoder 300 of FIG. 3, the ring opening numeral "1" will be separated by the ring closing numeral "1" by six cells 310, some receiving nodes and others receiving branch indicators, bond indicators, etc.

In some embodiments, the final hidden state 314 of the encoder 300, "$h_n$," serves as the encoded representation 316 that can be used to generate the spectrum 318 of the material. The final hidden state may be selected to include all structural information and to reduce the likelihood that a final operator is omitted that could affect the predicted features. Selecting the final hidden state 314 as the encoded representation 316 may be substituted by a preceding hidden state 314 in some cases, as when the spectrum string includes nodes that would be absent in a material form of the chemical. For example, the structure 306 includes an oxygen atom that would be absent in the polymerized form of PET. As such, the encoder 300 may output an encoded representation 316 from the second-to-last node, "C," rather than the last node, "O," such that the spectrum represents the polymer form rather than the monomer form. Prior to mapping 320, the encoded representation 316 may be processed to reduce the amount of data included in the encoded representation, as an approach to reduce the complexity of mapping 320.

The spectrum 318 can be or include a multi-dimensional vector representation of spectral features of an absorbance spectrum, which can be visually represented as a series of peaks, bands, or lines on a pair of axes describing wavelength, wavenumber, or other energy unit against relative intensity. The mapping 320 may include estimations of peak width and other distributive effects, such that the spectrum 318 describes a continuous curve, thereby predicting a characterization measurement of the structure 306. Mapping 320, shown in FIG. 3 as a simple vector product between a vector of bond multiplicities and a vocabulary of wavelengths, can generate the output spectrum 318 from the encoded representation 316. While the operation shown is a simple input/output mapping using vector operations, other information and operations may be included. For example, mapping 320 may include multi-dimensional vectors including both wavelength and intensity information, interaction terms to compensate for the effects of additives and contaminants on output spectra, and multiple operations in sequence, as when combining multiple encoded representations 316 to generate spectrum features for a composite material as a combined spectrum (e.g., as a combined spectrum array of data describing characteristic spectral features of the materials making up the composite). In some embodiments, the mapping 320 is implemented by a decoder network, as described previously in reference to encoder verification. For example, a decoder network may be trained to receive the encoded representation 316 as a fixed-length input and output a variable length sequence including the spectral features of the predicted spectrum 318. Training the decoder network can include the same or similar approaches described above in reference to verifying and training the encoder 300. In this way, the encoder 300 can be implemented as part of a sequence-to-sequence model trained to predict spectral features from structure strings.

To facilitate mapping 320 and to more accurately predict the spectrum 318, the encoder 300 may be trained to infer bonds or orientations in the structure 306 that are absent from the structure string 304. Latent chemical bond information may have a more significant influence on the spectral features included in the spectrum 318 than the nodes that are included in the structure string 304. As described below, the latent chemical bond information may map to a large portion of the features that appear in a characteristic spectrum.

Figure 4:
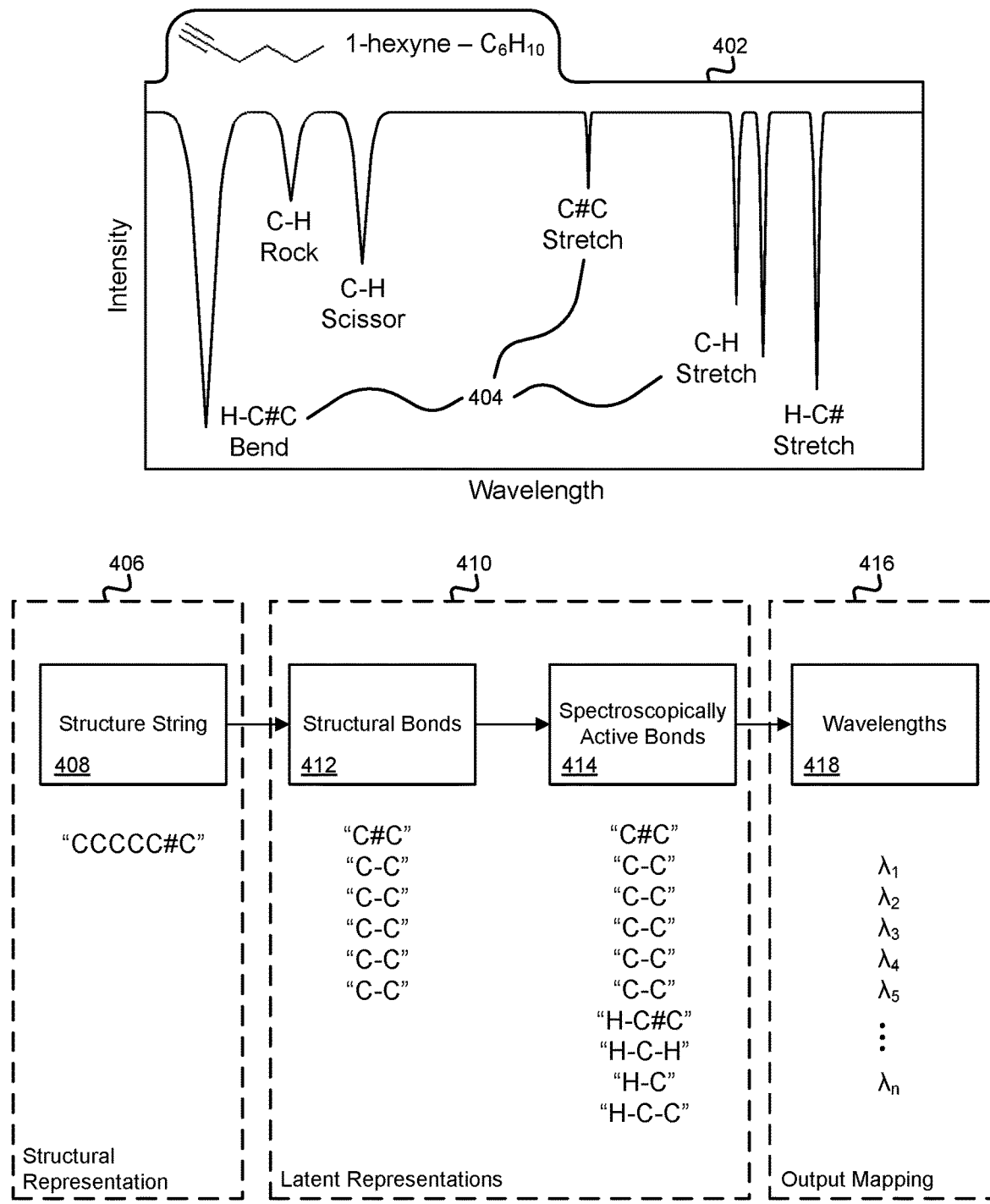
FIG. 4 illustrates an example workflow for generating a latent representation of a linear alkyne from an input representation, in accordance with some embodiments of the present disclosure.

FIG. 4 illustrates an example workflow 400 for generating a latent representation of a linear alkyne from an input representation, in accordance with some embodiments of the present disclosure. In the context of the NLP models described thus far, the workflow 400 describes the concept of latent representations and mapping in terms of an example chemical, 1-hexyne, having an unsaturated linear structure ($C_6H_{10}$). As illustrated in FIG. 4, the characteristic spectrum 402 of 1-hexyne includes six spectral features 404, each labeled with the respective bond vibration giving rise to the absorbance of IR radiation at a characteristic wavelength. It should be noted that the characteristic spectrum 402 omits multiple features of the actual spectrum of 1-hexyne and is not reproduced exactly to scale. As such, the spectral features 404 are not labeled with a specific wavelength or relative intensity. In a spectral database, a characteristic spectrum will typically describe the peak position of the spectral features, as well as other spectral characteristics, such as a qualitative intensity value. In the interest of simplicity, FIG. 4 omits such information in favor of focusing on the contribution of latent chemical bond information to the characteristic spectrum 402.

To demonstrate the importance of latent chemical bond information for predicting the spectral features 404, an structural representation 406 may include only the information conforming to a standard format. For example, a structure string 408 in SMILES format for 1-hexyne may include only information about nodes and non-single bonds, making the structural representation 406, "CCCCC#C." It can be seen in the characteristic spectrum 402, however, that three of the six spectral features 404 are attributed to carbon-hydrogen bonds in various forms of vibrational motion, such as rocking motion, scissoring motion, or stretching motion. In this way, the structural representation 406 omits information about hydrogen covalent bonds that are significant for predicting the spectral features 404.

To accurately predict the spectral features 404, the structural representation 406 is expanded to describe latent representations 410. For example, the latent representations 410 may include structural bonds 412 and/or spectroscopically active bonds 414. As vibrational spectroscopy measures covalent bonds, the structural bonds 412 may include implied information about single bonds that is omitted from the structure string 408. For example, the string "CCCCC#C" implies five carbon-carbon single bonds, "C—C" along with the triple bond "C#C."

From the structural bonds 412, further latent chemical bond information may be predicted, for example, based on the valence state of the carbon atoms. Since carbon atoms form four covalent bonds, the remaining available valence electrons may be populated with covalently bonded hydrogen atoms. As illustrated, the spectroscopically active bonds 414 include at least a portion of the structural bonds 412, as well as hydrogen covalent bonds, such as "H—C#C," "H—C—H," "H—C," and "H—C—C." To correctly populate the hydrogen atoms and covalent bonds, the structure of the molecule is be predicted from the structure string based, for example, on assumptions implicit in the structural representation 406. For example, in SMILES strings, a node is covalently bonded to the node preceding it and following it. Where the node is followed by a closing parenthesis or is at the end of the structure string 408, the node is bonded to the preceding node, with other bonding left implicit. In this way, the latent representation 410, such as the spectroscopically active bonds 414, include information not only based on the nodes themselves, but also on the sequence of the nodes in the structure string. As an illustrative example, the terminal carbon atom in 1-hexyne is bonded to three hydrogen atoms, which are not restricted in their motion in the same way as the two hydrogen atoms bonded to a middle-carbon atom. Such structural differences, as well as the constrained motion of the "C#C" triple bond, give rise to the spectral features 404. While omitted from the spectral features 404 in the interest of simplicity, carbon-carbon bonding can sometimes be observed in FTIR spectra. For this reason, the structural bonds 412 are included in the spectroscopically active bonds 414, although this is not always the case.

From the spectroscopically active bonds 414, as part of the latent representations 410, the output mapping 416 can be predicted. As shown in the characteristic spectrum 402, the spectral features 404 result from at least a portion of the spectroscopically active bonds 414. The output mapping 416, therefore, relies not on the structural representation 406, but rather on the latent representation 410, because the latent representation 410 includes implicit information about chemical structure, covalently bonded hydrogen atoms, and constraints on bond motion. This latent chemical bond information is used to arrive at the wavelengths 418, for example, of the predicted spectral features of the output mapping 416.

FIG. 5 illustrates an example flow describing a method 500 for generating a predicted spectrum of a material, in accordance with some embodiments of the present disclosure. As described in reference to FIGS. 1-4, one or more operations making up the method 500 may be executed by a computer system in communication with additional systems including, but not limited to, characterization systems, network infrastructure, databases, and user interface devices. In some embodiments, the method 500 includes operation 505, where the computer system inputs a structural representation of a material to an encoder model. The structural representation can be or include a structure string, which can be a SMILES string, an InChI string, or another standard text string format for representing the chemical structure of a material. As described above, the structural representation may leave at least some chemical bond information as implicit information. For example, a SMILES string excludes covalently bonded hydrogen atoms from the structural representation.

The encoder model may include an NLP model implemented in an artificial neural network. The encoder model may form part of a transformer model or an RNN model configured to generate a fixed-length encoded representation of the structural representation. The RNN model may incorporate LSTM cells or GRU cells that may be trained in multiple approaches. In some embodiments, encoder verification may include training the encoder as part of a sequence-to-sequence model that also includes a decoder. The decoder may also form part of a transformer model or an RNN model. In some embodiments, the encoder/decoder may be trained to translate one structural representation to another, such as from one structure string format to another structure string format, to verify that the encoder is predicting latent chemical bond information correctly. As described in reference to FIGS. 1-2, such an approach may permit training and tuning of the encoder in addition to training the encoder to identify spectroscopically active bond information.

The method 500 also includes operation 510, where the computer system generates the encoded representation of the structural representation. The encoded representation includes latent chemical bond information, including information about spectroscopically active bonds, some of which may have been implicit in the structural representation. The encoded representation is be a fixed-length multi-dimensional vector and may include information about bond multiplicity, specific to node identity. The length of the encoded representation may correspond to a bond vocabulary developed during encoder training and verification, where the encoder has been trained to predict bonds from the structural representation. The encoded representation may therefore include integer bond multiplicity information for bonds predicted to be incorporated in the structure of the material. For an encoder model using an RNN, the encoded representation can be a hidden state of one of the cells making up the RNN, for example, to account for the entire structure, the final hidden state can be outputted as the encoded representation. That being said, when a monomer is represented in the model input, one or more nodes may correspond to groups that are absent from the polymer unit. In such cases, the encoded representation can be generated from the hidden state outputted by an intermediate cell, before the final cell that receives the terminal node as its input state.

The method 500 also includes operation 515, where the computer system maps the encoded representation to a spectrum. In some embodiments, the mapping may be a simple input/output mapping, but may also include implementations of the decoder as part of a sequence-to-sequence model. For example, the NLP approach to mapping may provide additional information, resulting from training the encoder and the decoder together to predict spectral features from the structural representation. For simple input/output mappings, however, the spectrum can be generated by vector operations performed on the encoded representation, such as a vector product between the fixed-length vector making up the encoded representation and an array of wavelength-intensity values corresponding to a bond vocabulary from which the encoded representation includes bond multiplicity values.

The method 500 also includes operation 520, where the computer system outputs the spectrum. Outputting the spectrum may describe various operations, such as storing the spectrum in a library of predicted spectra, to populate the library with spectra for which measured spectra are unavailable. Similarly, the output spectra may be outputted for use to configure a sensor or detector system to identify a material.

III. System Environment

Figure 6:
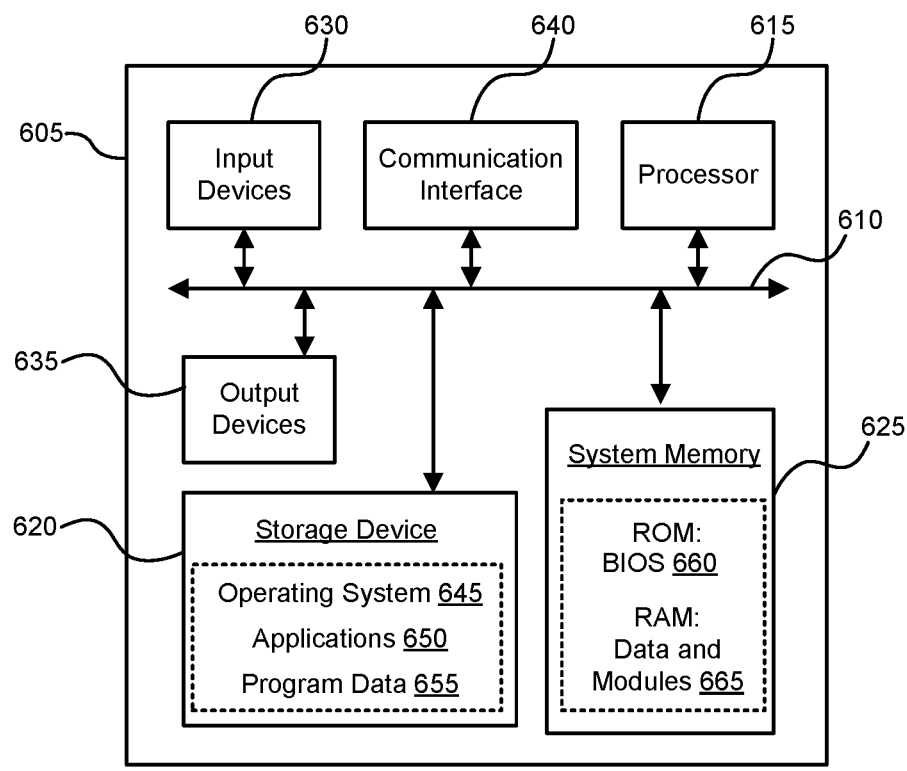
FIG. 6 is an illustrative architecture of a computing system implemented as some embodiments of the present disclosure.

FIG. 6 is an illustrative architecture of a computing system 600 implemented as some embodiments of the present disclosure. The computing system 600 is only one example of a suitable computing system and is not intended to suggest any limitation as to the scope of use or functionality of the present disclosure. Also, computing system 600 should not be interpreted as having any dependency or requirement relating to any one or combination of components illustrated in computing system 600.

As shown in FIG. 6, computing system 600 includes a computing device 605. The computing device 605 can be resident on a network infrastructure such as within a cloud environment, or may be a separate independent computing device (e.g., a computing device of a service provider). The computing device 605 may include a bus 610, processor 615, a storage device 620, a system memory (hardware device) 625, one or more input devices 630, one or more output devices 635, and a communication interface 640.

The bus 610 permits communication among the components of computing device 605. For example, bus 610 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 605.

The processor 615 may be one or more processors, microprocessors, or specialized dedicated processors that include processing circuitry operative to interpret and execute computer readable program instructions, such as program instructions for controlling the operation and performance of one or more of the various other components of computing device 605 for implementing the functionality, steps, and/or performance of the present disclosure. In certain embodiments, processor 615 interprets and executes the processes, steps, functions, and/or operations of the present disclosure, which may be operatively implemented by the computer readable program instructions. For example, processor 615 can retrieve, e.g., import and/or otherwise obtain or generate absorbance spectra, encode each absorbance spectrum, append a set of metadata features to each absorbance spectrum or an encoded vector for each absorbance spectrum, and decode each encoded vector. In embodiments, the information obtained or generated by the processor 615, e.g., the absorbance spectra, the encoded vectors, the decoded vectors, etc., can be stored in the storage device 620.

The storage device 620 may include removable/non-removable, volatile/non-volatile computer readable media, such as, but not limited to, non-transitory machine readable storage medium such as magnetic and/or optical recording media and their corresponding drives. The drives and their associated computer readable media provide for storage of computer readable program instructions, data structures, program modules and other data for operation of computing device 605 in accordance with the different aspects of the present disclosure. In embodiments, storage device 620 may store operating system 645, application programs 650, and program data 655 in accordance with aspects of the present disclosure.

The system memory 625 may include one or more storage mediums, including for example, non-transitory machine readable storage medium such as flash memory, permanent memory such as read-only memory ("ROM"), semi-permanent memory such as random access memory ("RAM"), any other suitable type of non-transitory storage component, or any combination thereof. In some embodiments, an input/output system 660 (BIOS) including the basic routines that help to transfer information between the various other components of computing device 605, such as during startup, may be stored in the ROM. Additionally, data and/or program modules 665, such as at least a portion of operating system 645, program modules, application programs 650, and/or program data 655, that are accessible to and/or presently being operated on by processor 615, may be contained in the RAM. In embodiments, the program modules 665 and/or application programs 650 can comprise, for example, a processing tool to identify and annotate spectrum data, a metadata tool to append data structures with metadata, and one or more encoder networks and/or encoder-decoder networks to predict spectra, which provides the instructions for execution of processor 615.

The one or more input devices 630 may include one or more mechanisms that permit an operator to input information to computing device 605, including, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 635 may include one or more mechanisms that output information to an operator, such as, but not limited to, audio speakers, headphones, audio line-outs, visual displays, antennas, infrared ports, tactile feedback, printers, or combinations thereof.

The communication interface 640 may include any transceiver-like mechanism (e.g., a network interface, a network adapter, a modem, or combinations thereof) that enables computing device 605 to communicate with remote devices or systems, such as a mobile device or other computing devices such as, for example, a server in a networked environment, e.g., cloud environment. For example, computing device 605 may be connected to remote devices or systems via one or more local area networks (LAN) and/or one or more wide area networks (WAN) using communication interface 640.

As discussed herein, computing system 600 may be configured to train an encoder-decoder network to predict an characteristic spectral features from a structural representation of a material obtained as a structure string. In particular, computing device 605 may perform tasks (e.g., process, steps, methods and/or functionality) in response to processor 615 executing program instructions contained in non-transitory machine readable storage medium, such as system memory 625. The program instructions may be read into system memory 625 from another computer readable medium (e.g., non-transitory machine readable storage medium), such as data storage device 620, or from another device via the communication interface 640 or server within or outside of a cloud environment. In embodiments, an operator may interact with computing device 605 via the one or more input devices 630 and/or the one or more output devices 635 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

IV. Additional Considerations

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure has been specifically disclosed by embodiments and optional features, modification and variation of the concepts herein disclosed may be resorted to by those skilled in the art, and that such modifications and variations are considered to be within the scope of this disclosure as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for generating spectroscopic data, the method comprising:
inputting, by a computing device, a text string comprising a structural representation of a material to an encoder of a natural language processing (NLP) model implemented with a multi-layer neural network, wherein the encoder of the NLP model is trained to treat chemical structure strings as natural language by generating encodings from vector embeddings that are based on the natural language;
generating, using the encoder of the NLP model, output of the encoder as an encoded representation of the text string comprising latent chemical bond information of the material not explicitly included in the structural representation of the material;
wherein the encoder comprises:
a first intermediate layer to generate first intermediate output as one or more vectors based on first characteristics of the text string; and
a second intermediate layer to generate second intermediate output as one or more vectors based on second characteristics of the text string; wherein the second characteristics are different from the first characteristics;
wherein the encoder is configured to use the first intermediate output and the second intermediate output to generate the output of the encoder as the encoded representation of the text string;
mapping, by the computing device, the encoded representation comprising the latent chemical bond information to a spectrum array, the spectrum array comprising predicted spectroscopic data of the material, wherein at least one spectral feature of the spectrum array is determined from the latent chemical bond information; and
outputting, by the computing device, the spectrum array;
wherein the encoder of the NLP model is trained using a training data set, including labeled characteristic spectra of materials collected from a database of spectral information, to predict spectroscopically active latent chemical bond information that describes spectroscopically active bonds implied in the structural representation based on a predicted vibrational motion of the spectroscopically active bonds within a wavelength range.

2. The method of claim 1, further comprising:
receiving a chemical identifier of the material; and
accessing, from a database of structural representations, the text string using the chemical identifier.

3. The method of claim 1, wherein the text string is a first text string, the material is a first material, the encoded representation is a first encoded representation, and then spectrum array is a first spectrum array, the method further comprising:
inputting a second text string comprising a structural representation of a second material to the encoder of the NLP model, the second material comprising an additive;
generating, using the encoder of the NLP model, a second encoded representation of the second text string comprising latent chemical bond information of the second material;
mapping the second encoded representation to a second spectrum array comprising predicted spectroscopic data of the second material;
generating a combined spectrum array using the first spectrum array and the second spectrum array; and
outputting the combined spectrum array.

4. The method of claim 1, further comprising:
processing the encoded representation to select an incomplete subset of the latent chemical bond information, wherein mapping the encoded representation comprises mapping the incomplete subset of the latent chemical bond information to a plurality of characteristic features in the spectrum array.

5. The method of claim 1, wherein the predicted spectroscopic data of the material comprises predicted wavelength and intensity information of a plurality of spectral features corresponding to the latent chemical bond information.

6. The method of claim 1, further comprising:
obtaining a plurality of chemical structure strings and a plurality of corresponding spectrometry data;
pre-processing the plurality of spectrometry data, wherein the pre-processing comprises (i) identifying a plurality of bonds in the plurality of chemical structure strings, and identifying one or more bands of interest in each spectrometry data set; and (ii) labelling a plurality of spectral features in each band of interest with chemical bond information corresponding to the plurality of bonds identified in the plurality of chemical structure strings;
inputting a batch of chemical structure strings from the plurality of chemical structure strings into the encoder of the NLP model in a training process;
adjusting weights and biases of the encoder in response to the training process; and
repeating the inputting and adjusting, and estimating using other batches of chemical structure strings until (i) a predetermined number of batches of chemical structure strings are processed or (ii) all the chemical structure strings are processed.

7. The method of claim 1, wherein the encoded representation comprises a multi-dimensional vector of wavelength and intensity describing a characteristic spectrum of the material, and wherein the multi-dimensional vector of wavelength and intensity includes latent chemical bond information of the material not explicitly included in the structural representation of the material.

8. The method of claim 1, further comprising:
outputting the spectrum array to a material characterization system of a chemical recycling process, enabling the material characterization system to identify the material as an input feedstock.

9. The method of claim 1, wherein the encoded representation represents a multi-dimensional vector representing a multiplicity of words from the structural representation as part of a vocabulary of words recognized and understood by the NLP model; and wherein the encoder of the NLP model is trained to include vocabulary building operations to increase the vocabulary of words recognized and understood by the NLP model, and wherein individual words of the vocabulary of words represent spectroscopically active bonds stored in association with wavelength-intensity values.

10. The method of claim 1, the method further comprising processing the output of the encoder by a decoder to generate a new text string comprising a new structural representation of the material; wherein the new text string includes one or more tokens based at least in part on the latent chemical bond information.

11. The method of claim 1, wherein the multi-layer neural network comprises a transformer model; wherein the first intermediate layer is a feed-forward layer that provides the first intermediate output to the second intermediate layer; and
wherein the multi-layer neural network uses positional information that accounts for ordering of sequence components of the text string.

12. The method of claim 1, wherein the multi-layer neural network comprises a recurrent neural network comprising a cell that has a gate to determine how much information to keep between a previous activation and a candidate activation of the cell.

13. The method of claim 1, wherein the multi-layer neural network comprises a bidirectional multi-layer neural network; wherein the first intermediate layer processes the text string in a forward direction to detect the first characteristics and the second intermediate layer processes the text string in a reverse direction to detect the second characteristics.

14. A system comprising:
one or more data processors; and
a non-transitory computer readable storage medium containing instructions which, when executed on the one or more data processors, cause the one or more data processors to perform operations comprising:
inputting, by a computing device, a text string comprising a structural representation of a material to an encoder of a natural language processing (NLP) model implemented with a multi-layer neural network, wherein the encoder of the NLP model is trained to treat chemical structure strings as natural language by generating encodings from vector embeddings that are based on the natural language;
generating, using the encoder of the NLP model, output of the encoder as an encoded representation of the text string comprising latent chemical bond information of the material not explicitly included in the structural representation of the material;
wherein the encoder comprises:
a first intermediate layer to generate first intermediate output as one or more vectors based on first characteristics of the text string; and
a second intermediate layer to generate second intermediate output as one or more vectors based on second characteristics of the text string; wherein the second characteristics are different from the first characteristics;
wherein the encoder is configured to use the first intermediate output and the second intermediate output to generate the output of the encoder as the encoded representation of the text string;
mapping, by the computing device, the encoded representation comprising the latent chemical bond information to a spectrum array, the spectrum array comprising predicted spectroscopic data of the material, wherein at least one spectral feature of the spectrum array is determined from the latent chemical bond information; and
outputting, by the computing device, the spectrum array;
wherein the encoder of the NLP model is trained using a training data set, including labeled characteristic spectra of materials collected from a database of spectral information, to predict spectroscopically active latent chemical bond information that describes spectroscopically active bonds implied in the structural representation based on a predicted vibrational motion of the spectroscopically active bonds within a wavelength range.

15. The system of claim 14, wherein the instructions, when executed, further cause the one or more data processors to perform operations comprising:
receiving a chemical identifier of the material; and
accessing, from a database of structural representations, the text string using the chemical identifier.

16. The system of claim 14, wherein the instructions, when executed, further cause the one or more data processors to perform operations comprising:
processing the encoded representation to select an incomplete subset of the latent chemical bond information, wherein mapping the encoded representation comprises mapping the incomplete subset of the latent chemical bond information to a plurality of characteristic features in the spectrum array.

17. The system of claim 14, wherein the encoded representation comprises a multi-dimensional vector of wavelength and intensity describing a characteristic spectrum of the material, and wherein the multi-dimensional vector of wavelength and intensity includes latent chemical bond information of the material not explicitly included in the structural representation of the material.

18. The system of claim 14, wherein the instructions, when executed, further cause the one or more data processors to perform operations comprising:
outputting the spectrum array to a material characterization system of a chemical recycling process, enabling the material characterization system to identify the material as an input feedstock.

19. The system of claim 11, wherein the encoded representation represents a multi-dimensional vector representing a multiplicity of words from the structural representation as part of a vocabulary of words recognized and understood by the NLP model; and wherein the encoder of the NLP model is trained to include vocabulary building operations to increase the vocabulary of words recognized and understood by the NLP model, and wherein individual words of the vocabulary of words represent spectroscopically active bonds stored in association with wavelength-intensity values.

20. The system of claim 14, wherein the operations further comprise processing the output of the encoder by a decoder to generate a new text string comprising a new structural representation of the material; wherein the new text string includes one or more tokens based at least in part on the latent chemical bond information.

21. The system of claim 14, wherein the multi-layer neural network comprises a transformer model; wherein the first intermediate layer is a feed-forward layer that provides the first intermediate output to the second intermediate layer; and
wherein the multi-layer neural network uses positional information that accounts for ordering of sequence components of the text string.

22. A computer-program product tangibly embodied in a non-transitory machine-readable storage medium, including instructions configured to cause one or more data processors to perform operations comprising:
inputting, by a computing device, a text string comprising a structural representation of a material to an encoder of a natural language processing (NLP) model implemented with a multi-layer neural network, wherein the encoder of the NLP model is trained to treat chemical structure strings as natural language by generating encodings from vector embeddings that are based on the natural language;
generating, using the encoder of the NLP model, output of the encoder as an encoded representation of the text string comprising latent chemical bond information of the material not explicitly included in the structural representation of the material;
wherein the encoder comprises:
a first intermediate layer to generate first intermediate output as one or more vectors based on first characteristics of the text string; and
a second intermediate layer to generate second intermediate output as one or more vectors based on second characteristics of the text string; wherein the second characteristics are different from the first characteristics;
wherein the encoder is configured to use the first intermediate output and the second intermediate output to generate the output of the encoder as the encoded representation of the text string;

mapping, by the computing device, the encoded representation comprising the latent chemical bond information to a spectrum array, the spectrum array comprising predicted spectroscopic data of the material, wherein at least one spectral feature of the spectrum array is determined from the latent chemical bond information; and outputting, by the computing device, the spectrum array;

wherein the encoder of the NLP model is trained using a training data set, including labeled characteristic spectra of materials collected from a database of spectral information, to predict spectroscopically active latent chemical bond information that describes spectroscopically active bonds implied in the structural representation based on a predicted vibrational motion of the spectroscopically active bonds within a wavelength range.

23. The computer-program product of claim 18, wherein the encoded representation represents a multi-dimensional vector representing a multiplicity of words from the structural representation as part of a vocabulary of words recognized and understood by the NLP model; and wherein the encoder of the NLP model is trained to include vocabulary building operations to increase the vocabulary of words recognized and understood by the NLP model, and wherein individual words of the vocabulary of words represent spectroscopically active bonds stored in association with wavelength-intensity values.

24. The computer-program product of claim 22, wherein the operations further comprise processing the output of the encoder by a decoder to generate a new text string comprising a new structural representation of the material; wherein the new text string includes one or more tokens based at least in part on the latent chemical bond information.

25. The computer-program product of claim 22, wherein the multi- layer neural network comprises a transformer model; wherein the first intermediate layer is a feed-forward layer that provides the first intermediate output to the second intermediate layer; and wherein the multi-layer neural network uses positional information that accounts for ordering of sequence components of the text string.

* * * * *